(12) United States Patent
Fang et al.

(10) Patent No.: US 12,515,348 B2
(45) Date of Patent: Jan. 6, 2026

(54) METHOD FOR CONTROLLING MULTI-ROBOT COLLABORATING INTELLIGENT DRILLING AND RIVETING SYSTEM FOR SHELTER

(71) Applicant: THE 28TH RESEARCH INSTITUTE OF CHINA ELECTRONICS TECHNOLOGY GROUP CORPORATION, Jiangsu (CN)

(72) Inventors: Lei Fang, Jiangsu (CN); Qinglong Yang, Jiangsu (CN); Junlin Wan, Jiangsu (CN); Guodong Wang, Jiangsu (CN); Zili Xu, Jiangsu (CN); Yang Tian, Jiangsu (CN); Qi Zhang, Jiangsu (CN); Siwei Fang, Jiangsu (CN)

(73) Assignee: THE 28TH RESEARCH INSTITUTE OF CHINA ELECTRONICS TECHNOLOGY GROUP CORPORATION, Jiangsu (CN)

( * ) Notice: Subject to any disclaimer, the term of this patent is extended or adjusted under 35 U.S.C. 154(b) by 137 days.

(21) Appl. No.: 18/644,050

(22) Filed: Apr. 23, 2024

(65) Prior Publication Data
US 2024/0416525 A1 Dec. 19, 2024

Related U.S. Application Data

(63) Continuation of application No. PCT/CN2023/131205, filed on Nov. 13, 2023.

(30) Foreign Application Priority Data

Jun. 14, 2023 (CN) .......................... 202310699731.9

(51) Int. Cl.
*B25J 9/16* (2006.01)
*B25J 11/00* (2006.01)
*B25J 19/02* (2006.01)

(52) U.S. Cl.
CPC .......... *B25J 11/007* (2013.01); *B25J 9/1661* (2013.01); *B25J 19/022* (2013.01)

(58) Field of Classification Search
CPC ...... B25J 11/007; B25J 9/1661; B25J 19/022; B25J 9/1697; B25J 9/1682; B25J 9/0084;
(Continued)

(56) References Cited

U.S. PATENT DOCUMENTS

2020/0171665 A1    6/2020  Kono et al.

FOREIGN PATENT DOCUMENTS

| CN | 102284956 A | * | 12/2011 | ............. B25J 13/00 |
| CN | 102636110 A | * | 8/2012  | ............. G01B 11/00 |

(Continued)

OTHER PUBLICATIONS

"International Search Report (Form PCT/ISA/210) of PCT/CN2023/131205," mailed on Jan. 12, 2024, pp. 1-4.
(Continued)

*Primary Examiner* — Khoi H Tran
*Assistant Examiner* — Tanner L Cullen
(74) *Attorney, Agent, or Firm* — JCIPRNET

(57) ABSTRACT

The present invention discloses a method for controlling a multi-robot collaborating intelligent drilling and riveting system for a shelter, including the following steps: generating a robot scanning trace according to a key characteristic parameter of the shelter; performing laser scanning on an angle aluminum edge to acquire a drilling position of the shelter; establishing a task allocation mechanism, establishing a drilling and riveting task propensity model according to the task allocation mechanism, and allocating automatic drilling and riveting tasks to multiple robots based on the drilling and riveting task propensity model; and establishing a drilling angle compensation value model, where automatic drilling and riveting robots perform position compensation (Continued)

based on the drilling angle compensation value model to complete drilling and riveting.

8 Claims, 5 Drawing Sheets

(58) Field of Classification Search
CPC ...... B25J 9/0087; B25J 9/1669; B25J 9/1664; B25J 13/089
See application file for complete search history.

(56) References Cited

FOREIGN PATENT DOCUMENTS

| CN | 109848713 | | 6/2019 | | |
|---|---|---|---|---|---|
| CN | 111664812 | A * | 9/2020 | ............. | G01B 11/27 |
| CN | 115139314 | | 10/2022 | | |
| CN | 115302527 | | 11/2022 | | |
| CN | 115302527 | A * | 11/2022 | ............ | B25J 9/1679 |
| CN | 116442247 | | 7/2023 | | |

OTHER PUBLICATIONS

"Written Opinion of the International Searching Authority (Form PCT/ISA/237) of PCT/CN2023/131205," mailed on Jan. 12, 2024, pp. 1-4.

* cited by examiner

METHOD FOR CONTROLLING MULTI-ROBOT COLLABORATING INTELLIGENT DRILLING AND RIVETING SYSTEM FOR SHELTER

CROSS-REFERENCE TO RELATED APPLICATION

This application is a continuation of international application of PCT application serial no. PCT/CN2023/131205 filed on Nov. 13, 2023, which claims the priority benefit of China application no. 202310699731.9 filed on Jun. 14, 2023. The entirety of each of the above mentioned patent applications is hereby incorporated by reference herein and made a part of this specification.

TECHNICAL FIELD

The present invention relates to the field of automatic production of shelters and particularly relates to a method for controlling a multi-robot collaborating intelligent drilling and riveting system for a shelter.

BACKGROUND

The demand on a shelter, as a main highly maneuverable carrier for military equipment such as a command and control system and civil facilities such as medical facilities, is increasingly improved on military and civil markets. In view of the application scenarios of a shelter product, the shelter product usually features a high degree of customization, various varieties, and small batches.

A plurality of steps such as bottom hole drilling, gluing, and riveting are needed for drilling and riveting operations in angle aluminum installation when angle aluminum of the shelter and a large plate frame of the shelter are spliced. Owing to the lack of necessary intelligent operation equipment, it mainly relies on manual operations or automatic dedicated machines. The manual operations feature high intensity, requiring manual switching of drilling tools, gluing tools, and riveting tools, which often need multi-person cooperation so that the operation efficiency is low. As human resource is severely wasted, it is a typical labor-intensive industry. With the increase of human cost, shelter production enterprises nowadays face the problems of a shortage of workforce and difficulty in labor.

While, existing automatic dedicated machines are short of necessary intelligent perception, path planning, and task allocation algorithms, they need to acquire coordinates of perforating and riveting points through manual teaching programming at present, so that the tasks are heavy, and the time is even longer than the actual working time of the machine, and therefore, improvement of the production efficiency is limited. At the same time, as certain size and angle errors will often be generated in the shelter splicing production process, the end executor of an existing automatic process device is hardly able to adapt to the error caused by splicing the shelter, so that product quality and consistency are further reduced. For the automatic process devices such as the automatic drilling and riveting robots, the axial forces generated in the perforating process are likely to cause deformation of the process devices as a result of their rigid defects, so that they deviate from a target point. The existing automatic functional process devices are hard to adapt to correction, and the hole site errors caused often hardly meet the riveting requirement, so an automatic riveting process is interrupted, and the devices or the shelter are damaged. Therefore, the product quality and production efficiency are further reduced. Moreover, the body of the shelter is usually longer than 6 m, and one automatic device is hard to cover all in terms of an arrival property.

Therefore, it is an urgent need to solve the above problems.

SUMMARY

An object of the present invention is to provide a method for controlling a multi-robot collaborating intelligent drilling and riveting system for a shelter with efficient operations.

The technical solution is as follows: to achieve the above object, the present invention discloses a method for controlling a multi-robot collaborating intelligent drilling and riveting system for a shelter, including the following steps:

(1) generating a robot scanning trace according to a key characteristic parameter of the shelter, (2) performing laser scanning on the angle aluminum edge to acquire a drilling position of the shelter;

(3) establishing a task allocation mechanism, establishing a drilling and riveting task propensity model according to the task allocation mechanism, and allocating automatic drilling and riveting tasks to multiple robots based on the drilling and riveting task propensity model; and (4) establishing a drilling angle compensation value model, where the automatic drilling and riveting robots perform position compensation based on the drilling angle compensation value model to finish drilling and riveting.

A specific method for generating the robot scanning trace according to the key characteristic parameter of the shelter in step (1) includes the following steps:

setting the key characteristic parameters of the shelter, the key characteristic parameters of the shelter including a length l of the shelter, a width $w_1$ of the shelter, a projection width $w_2$ of a chamfered portion at a top of the shelter in a horizontal plane, a height h of the shelter, and a chamfered angle $\theta$ of the shelter, where if the shelter is a right-angled shelter, $w_2=0$;

setting a datum point of the shelter on a robot ground rail as an origin of coordinates, and establishing a coordinate axis by means of a right-handed system; respectively storing end points of the shelter in form of two sets of arrays according to the right-angled shelter and a chamfered shelter;

representing a safe scanning distance by $d_{-scan}$, numbering four automatic shelter drilling and riveting robots as 1 #, 2 #, 3 #, and 4 #, and numbering safe points of scanning actions corresponding to the automatic drilling and riveting robots as $O_1$, $O_2$, $O_3$, and $O_4$, and parameterizing the safe points as follows:

$$O_1 = (-d_{-scan}, d_{-scan}, h + w_2 * \sin\theta + d_{-scan})$$
$$O_2 = (w1 + d_{-scan}, d_{-scan}, h + w_2 * \sin\theta + d_{-scan})$$
$$O_3 = (-d_{-scan,l} + d_{-scan}, h + w_2 * \sin\theta + d_{-scan})$$
$$O_2 = (w + d_{-scan,l} + d_{-scan}, h + w_2 * \sin\theta + d_{-scan});$$

for parameterized storage of angle aluminum edges, storing 8 faces of the chamfered shelter in the form of an array with a capacity of 8, and storing 6 faces of the right-angled shelter in the form of an array with a capacity of 6; respectively representing the 8 faces and the 6 faces in sequences from front to back, from top to bottom and from left to right as follows:

FACE1: [face$_1$, face$_2$, face$_3$, face$_4$, face$_5$, face$_7$, face$_8$]
FACE2: [face$_1$, face$_2$, face$_3$, face$_4$, face$_5$, face$_6$], where there are totally 4 angle aluminum edges for each face of the shelter, which are calibrated as a set of arrays JL: [jl$_1$,jl$_2$, jl$_3$, jl$_4$] in a clockwise direction, and all angle aluminum edges of one chamfered shelter are represented as follows:

$$JL * FACE1 = \begin{bmatrix} jl_1 \\ jl_2 \\ jl_3 \\ jl_4 \end{bmatrix} \cdot [face_1, face_2, face_3, face_4, face_5, face_6, face_7, face_8,];$$

all angle aluminum edges of a right-angled shelter are represented as:

$$JL * FACE2 = \begin{bmatrix} jl_1 \\ jl_2 \\ jl_3 \\ jl_4 \end{bmatrix} \cdot [face_1, face_2, face_3, face_4, face_5, face_6, face_7, face_8,],$$

that is, all the angle aluminum edges of a shelter to be polished are stored with jl$_1$ face$_1$, jl$_1$ face$_2$ . . . , and any one angle aluminum edge is represented as jlifacek, where values of i and k are $$\begin{cases} i \in [1, 4], k \in [1, 8]; & w_2 \neq 0 \\ i \in [1, 4], k \in [1, 6]; & w_2 = 0 \end{cases};$$

judging whether the inputted key characteristic parameter w$_2$ of the shelter is 0, if w$_2$=0, it indicates that the shelter is the right-angled shelter with 6 face$_5$, and a maximum value of k is 6; or if w$_2$≠0, it indicates that the shelter has 8 face$_5$, and a maximum value of k is 8;

acquiring a scanning vector of the robot through coordinate differences of the end points of the shelter, generating the scanning trace of the robot, that is, driving, by the robot, a camera coordinate system to start from the safe point of the scanning action along the scanning vector parallel to the angle aluminum edge to be scanned to successively traverse all angle aluminum edges, and storing the scanning traces of the angle aluminum edges corresponding to each robot in the form of the structure array, where a capacity of the struct array is a maximum quantity of the angle aluminum edges, a maximum quantity of the angle aluminum edges of the chamfered shelter is 32, a maximum quantity of the angle aluminum edges of the right-angled shelter is 24, and each struct element in an array includes the following patterns:

```
STRUCT{
Vector a //defining the scanning vector
  INT    N //defining the numbers of the robots
  CString code //defining the numbers of the angle aluminum edges
  }.
```

Preferably, the end points of the shelter are respectively stored in the form of two sets of arrays according to the right-angled shelter and the chamfered shelter, and the right-angled shelter is represented by an array with the capacity of 8 as follows:

$$\begin{bmatrix} (0, 0, 0), (0, 0, h), (w_1, 0, 0), (w_1, 0, h) \\ (0, l, 0), (0, l, h), (w_1, l, 0), (w_1, l, h) \end{bmatrix},$$

the chamfered shelter is represented by an array with the capacity of 12 as follows:

$$\begin{bmatrix} (0, 0, 0), (0, 0, h), (w_1, 0, 0), (w_1, 0, h), \\ (w_2 * \cos\theta, 0, h + w_2 * \sin\theta), (w_1 - w_2 * \cos\theta, 0, h + w_2 * \sin\theta) \\ (0, l, 0), (0, l, h), (w_1, l, 0), (w_1, l, h), \\ (w_2 * \cos\theta, l, h + w_2 * \sin\theta), (w_1 - w_2 * \cos\theta, l, h + w_2 * \sin\theta) \end{bmatrix}$$

first, whether the inputted key characteristic parameter w$_2$ of the shelter is 0 is judged, and if the key characteristic parameter is 0, the array of the right-angled shelter is called, or if the key characteristic parameter is not 0, the array of the chamfered shelter is called.

Further, the performing laser scanning on the angle aluminum edge to acquire a drilling position of the shelter in step (2) specifically includes the following steps:

(2.1) selecting n fixed points P within an arrival range of an N #N∈[1, 4]$_{th}$ drilling and riveting robot, to acquire corresponding coordinates P_robot and P_camera of the fixed points P in the camera coordinate system and the robot coordinate system, respectively;

(2.2) acquiring a coordinate transformation matrix T=P_robot*(P_camra)$^{-1}$ through P_robot=T*P_camera;

(2.3) sending, by the automatic drilling and riveting robot, a character string to a 3D visual camera, and parsing, by the 3D visual camera, the character string to acquire the number of the automatic drilling and riveting robot;

(2.4) starting, by the 3D visual camera, linear laser, and scanning, by the automatic drilling and riveting robot according to the scanning trace, an area where the angle aluminum is installed at an edge of the shelter;

(2.5) differentiating, by the 3D visual camera, the angle aluminum edge from aluminum skin of the shelter according to a height difference of laser reflected in the scanning process, and generating a point cloud image of the angle aluminum edge;

(2.6) extracting boundary points of the point cloud image of the angle aluminum edge and coordinates thereof, and eliminating noisy points in the point cloud image;

(2.7) successively connecting the extracted boundary points end to end clockwise to acquire a contour image of the angle aluminum edge;

(2.8) biasing a width direction of the contour image of the angle aluminum edge according to a set minimum distance from a rivet to an edge of a length direction of the angle aluminum edge, and biasing the length direction of the contour image of the angle aluminum edge according to a minimum distance from the rivet to an edge of a width direction of the angle aluminum edge;

(2.9) calculating an intersection point of two biased straight lines as a drilling starting position of the angle aluminum edge;

(2.10) establishing a stack for storing a drilling position at the angle aluminum edge;

(2.11) converting the drilling starting point in the camera coordinate system into a coordinate position of the automatic drilling and riveting robot through the coordinate transformation matrix T, and storing the coordinate position at a bottom of the stack;

(2.12) judging whether a length l of a remaining angle aluminum edge is less than a maximum spacing 3*D between drill bits of a gang drill, and if the length l of the remaining angle aluminum edge is less than the maximum spacing, skipping to (2.13), or if the length l of the remaining angle aluminum edges is not less than the maximum spacing, skipping to (2.14);

(2.13) performing biasing according to the maximum spacing 3*D between drill bits of a gang drill in the length direction to acquire a drilling position of the gang drill for the angle aluminum edge, and converting the drilling position into coordinates of the automatic drilling and riveting robot;

(2.14) marking a current point processing method as the gang drill, and storing current point locations in the stack;

(2.15) judging whether a set boundary distance of the angle aluminum edge has been reached, and if the set boundary distance of the angle aluminum edge has been reached, skipping to (2.16), or if the set boundary distance of the angle aluminum edge has not been reached, skipping to (2.17);

(2.16) performing biasing with a minimum hole spacing D of gang drill, and converting the drilling starting point in the camera coordinate system into the coordinate position of the automatic drilling and riveting robot;

(2.17) marking the current point processing method as a single drill, storing the current point locations in the stack, and skipping to (2.15); and (2.18) sending coordinates of points in the stack to the automatic drilling and riveting robot in a first-in last-out sequence, and using the coordinates as position points for perforating, and ending a scanning flow.

Further, the task allocation mechanism in step (3) includes: each automatic drilling and riveting robot processes an angle aluminum edge of the shelter needed to be drilled and riveted at most first, that is, the robot selects the angle aluminum edge with a greatest number of holes to be drilled first; each automatic drilling and riveting robot avoids interference with or waiting other robots, that is, the robot selects a path with a smallest interference area with other robots first; each automatic drilling and riveting robot abandons an angle aluminum edge of the shelter with high self-motion complexity, that is, the robot selects an angle aluminum edge with a least total amount of motion of joints of the robot and the shortest total motion time; and drilling and riveting of each angle aluminum edge is completed by two automatic drilling and riveting robots at most.

Further, the drilling and riveting task propensity model in step (3) is as follows:

$$F_K = \alpha_1 M_t - \alpha_2 T_t - \alpha_3 S_t$$

where $\alpha_1$ is a work task weight coefficient with a value interval of [1,2], $$M_t = \frac{INT(L_t/d\Delta)}{(\sum_{t=0}^{max}(L_t/d\Delta))/max},$$

$M_t$ is a quantity of holes to be drilled in a $t^{th}$ angle aluminum edge, $INT(L_t/d\Delta)$ is proportional rounding of a length $L_t$ of the angle aluminum edge and a hole spacing $d\Delta$ from the length, max is a total quantity of the angle aluminum edges, max of the chamfered shelter is 32, and max of the right-angled shelter is 24;

$\alpha_2$ is a safety weight coefficient, with a value interval of [0.5,1], $T_t$ is a ratio of a length $R_t$ of an overlapped arrival area between a current angle aluminum edge and other robots to a length $L_t$ of the current angle aluminum edge, that is, $T_t = R_t/L_t$;

$\alpha_3$ is an efficiency weight coefficient, with a value interval of [0.2, 0.5], $$S_t = \frac{A_t}{(\sum_{t=0}^{total} A_t)/total},$$

where $A_t$ is total time when the current automatic drilling and riveting robot completes a current angle aluminum edge operation:

$$A_t = A_{safe1\_t} + A_{sm\_t} + A_{safe2\_t} + A_{hd\_t} +$$
$$A_{safe3\_t} + A_{dk\_t} + A_{hd2\_t} + A_{safe4\_t} + A_{tm\_t} + A_{wait\_t}$$

where $A_{safe1\_t}$ is time for the robot from the safe point to a scanning start point, $A_{sm\_t}$ is scanning time, $A_{safe2\_t}$ is time from a scanning end point to the safe point, $A_{hd\_t}$ is tool changing time, $A_{safe3\_t}$ is time from a tool changing point to the safe point, $A_{dk\_t}$ is perforating time, $A_{hd2\_t}$ is time when a gluing and riveting tool end is changed, $A_{safe4\_t}$ is time from a tool changing point of a gluing and riveting module to the safe point, $A_{tm\_t}$ is time when gluing and riveting are executed, $A_{wait\_t}$ is wait time, and total is a total quantity of the angle aluminum edges judged to be arrived by the current robot.

Preferably, the allocating automatic drilling and riveting tasks to multiple robots in step (3) specifically includes the following steps:

(3.1) initialization: setting a serial number label N=1 of the automatic drilling and riveting robot, and setting number-of-times labels $M_t$=1 of all angle aluminum edges to be drilled and riveted;

(3.2) acquiring the inputted projection width $w_2$ of the chamfering portion at the top of the shelter in the horizontal plane;

(3.3) judging whether $w_2$ is 0, where if $w_2$ is 0, skipping to (3.4), or if $w_2$ is not 0, skipping to (3.5);

(3.4) setting a maximum quantity max of the angle aluminum edges to 24 and a maximum plane quantity max_p to 6;

(3.5) setting a maximum quantity max of the angle aluminum edges to 32 and a maximum plane quantity max_p to 8;

(3.6) judging whether N is >4, where if N is not >4, skipping to (3.7), and if N is >4, skipping to (3.26);
(3.7) setting k=1;
(3.8) judging whether k is >max_p, where if k is not >max_p, skipping to (3.9), or if k is >max_p, skipping to (3.23);
(3.9) setting i=1;
(3.10) judging whether i is >4, where if i is not >4, skipping to (3.11), and if i is >4, skipping to (3.22);
(3.11) setting t=(k−1)*max_p+i;
(3.12) judging whether an N $\#^{th}$ automatic drilling and riveting robot arrives at the $t^{th}$ angle aluminum edge, where if the N $\#^{th}$ automatic drilling and riveting robot arrives at the $t^{th}$ angle aluminum edge, skipping to (3.13), or if the N $\#^{th}$ automatic drilling and riveting robot does not arrive at the $t^{th}$ angle aluminum edge, skipping to (3.21);
(3.13) judging whether the number-of-times label of the current angle aluminum edge to be drilled and riveted is $M_t$=2?, where if the number-of-times label of the current angle aluminum edge to be drilled and riveted is $M_t$=2?, skipping to (3.14), or if the number-of-times label of the current angle aluminum edge to be drilled and riveted is not $M_t$=2?, skipping to (3.21);
(3.14) substituting set values of the length of the current angle aluminum edge and a perforating spacing into INT($L_t$/dΔ).
(3.15) calculating a work task weight $$M_t = \frac{INT(L_t/d\Delta)}{(\sum_{t=0}^{max}(L_t/d\Delta))/max}$$

of the current angle aluminum edge;
(3.16) calculating a length $L_t$ of an overlapped arrival area between the current drilling and riveting robot and remaining automatic drilling and riveting robots in an operation process of the current angle aluminum edge;
(3.17) calculating a safety weight coefficient $T_t=R_t/L_t$ of the current angle aluminum edge;
(3.18) calculating operation time $A_t=A_{safe1\_t}+A_{sm\_t}+A_{safe2\_t}+A_{hd\_t}+A_{safe3\_t}+A_{dk\_t}+A_{hd\_2}+A_{safe4\_t}+A_{tm\_t}+A_{wait\_t}$ for the current drilling and riveting robot at the current angle aluminum edge;
(3.19) calculating a processing efficiency weight coefficient $$S_t = \frac{A_t}{(\sum_{t=0}^{total} A_t)/total}$$

of the current angle aluminum edge;
(3.20) substituting the processing efficiency weight value into the drilling and riveting task propensity model, $F_K=\alpha1M_t-\alpha2T_t-\alpha3A_t$ to calculate a drilling and riveting task propensity of the current angle aluminum edge;
(3.21) i=i+1, skipping to (3.9);
(3.22) k=k+1, skipping to (3.8);
(3.23) sequencing the drilling and riveting task propensity of the current automatic drilling and riveting robot on all angle aluminum edges in a descending order;
(3.24) taking Int(max/3) angle aluminum edges from all angle aluminum edges according to a sequencing result, and setting the number-of-time s label of the angle aluminum to be drilled and riveted of the angle aluminum edges to $M_t=M_t+1$.
(3.25) N=N+1, skipping to (3.6);
(3.26) setting s=1;
(3.27) judging whether s is >max_p, where if s is >max_p, skipping to (3.28) and if s is not >max_p, skipping to (3.33);
(3.28) judging whether the $t^{th}$ angle aluminum edge $M_t$ is >2, where if the $t^{th}$ angle aluminum edge is not >2, skipping to (3.32), or if the $t^{th}$ angle aluminum edge is >2, skipping to (3.29);
(3.29) acquiring the numbers of two automatic drilling and riveting robots with drilling and riveting tasks allocated at the current angle aluminum edges;
(3.30) calculating quantities Σ($L_z$/dΔ) of drilling tasks allocated to the current two automatic drilling and riveting robots;
(3.31) comparing the quantities of the drilling tasks allocated to the two automatic drilling and riveting robots, allocating a drilling task to an automatic drilling and riveting robot with a relatively small quantity of drilling tasks, where if the quantities of the tasks for the two automatic drilling and riveting robots are the same, the task is allocated to the automatic drilling and riveting robot with a relatively small number by default;
(3.32) s=s+1, skipping to (3.27); and
(3.33) completing allocation of all tasks to the automatic drilling and riveting robots, and sending all allocated drilling and riveting tasks to corresponding automatic drilling and riveting robots according to the stored numbers of the automatic drilling and riveting robots, and starting to execute, by the automatic drilling and riveting robots, automatic drilling and riveting operations i n a descending order according to the stored drilling and riveting task propensities.

Further, the establishing the drilling angle compensation value model in step (4) specifically includes the following steps:

establishing a numerical value model for a compensation value and a distance from a drilling point of the angle aluminum edge of the shelter to a center of the automatic drilling and riveting robot at jlifacek of each angle aluminum edge of the shelter:

$$C(t) = \frac{x1t^2 + x2\exp(x3t)}{t},$$

where C is a system compensation value of each automatic drilling and riveting robot, t is a distance from the automatic drilling and riveting robot to a drilling central point, and x1, x2, and x3 are parameters to be determined;

by operating the automatic drilling and riveting robot to perform a drilling test on the angle aluminum edge at the jlifacek, acquiring a distance of a drilled hole deviated from a set numerical value and a distance from the automatic drilling and riveting robot to the drilling central point, so as to establish a parameter acquisition and optimization model of the numerical value model for the distance from the drilling point of the angle aluminum edge of the shelter to the center of the automatic drilling and riveting robot:

$$\begin{cases} \min S(X) \triangleq \sum_{m=1}^{20} |f(t_i, X) - c_i| \\ f(t_i, X) = \dfrac{x_1 t_m^2 + x_2 \exp(x_3 t_m)}{t_m}, \ m = 1, 2, 3 \ ... \ 20 \end{cases};$$

and substituting data into the equations to obtain an optimal solution $X(x_1, x_2, x_3)$ of each set of compensation value coefficients, so as to acquire the drilling angle compensation value model during automatic drilling and riveting of the angle aluminum edge, and repeating the steps until compensation value models for all angle aluminum edges are acquired.

Preferably, the performing position compensation in step (4) specifically includes the following steps:

(4.1) determining the number of the angle aluminum edge;

(4.2) calling the drilling angle compensation value model during automatic drilling and riveting at the angle aluminum edges according to the numbers of the angle aluminum edges;

(4.3) calculating a distance from each target drilling point to the center of the automatic drilling and riveting robot according to a result obtained by scanning;

(4.4) substituting the distance from each target drilling point to the center of the automatic drilling and riveting robot into the compensation value model to acquire angle compensation values of all drilling points and storing the angle compensation values; and (4.5) compensating the drilling angles according to the acquired compensation values.

Further, the intelligent drilling and riveting system for a shelter includes the automatic drilling and riveting robots, a quick change disc, a drilling end executor, a riveting and gluing end executor, a 3D visual camera, a tool changing table, a PLC electric control cabinet, a robot bottom plate, a shelter transfer vehicle and the robot ground rail, and there are totally 4 automatic drilling and riveting robots, numbered as 1 #, 2 #, 3 #and 4 #.

The present invention has the following beneficial effects: compared with the prior art, the present invention has the following significant advantages: the present invention has drilling, gluing, and riveting functions simultaneously according to a demand on a shelter production process completely, has the mechanism of identifying and scanning the production trajectory and performing task allocation, can adjust the processing position according to the splicing error of the shelter, and is precise to position; the multiple drilling and riveting robots are divided with work in order and cooperate to drill and rivet angle aluminum of the shelter automatically, so that an efficient, high-quality and highly intelligent installation operation of the angle aluminum for the shelter is achieved.

Figure 1:
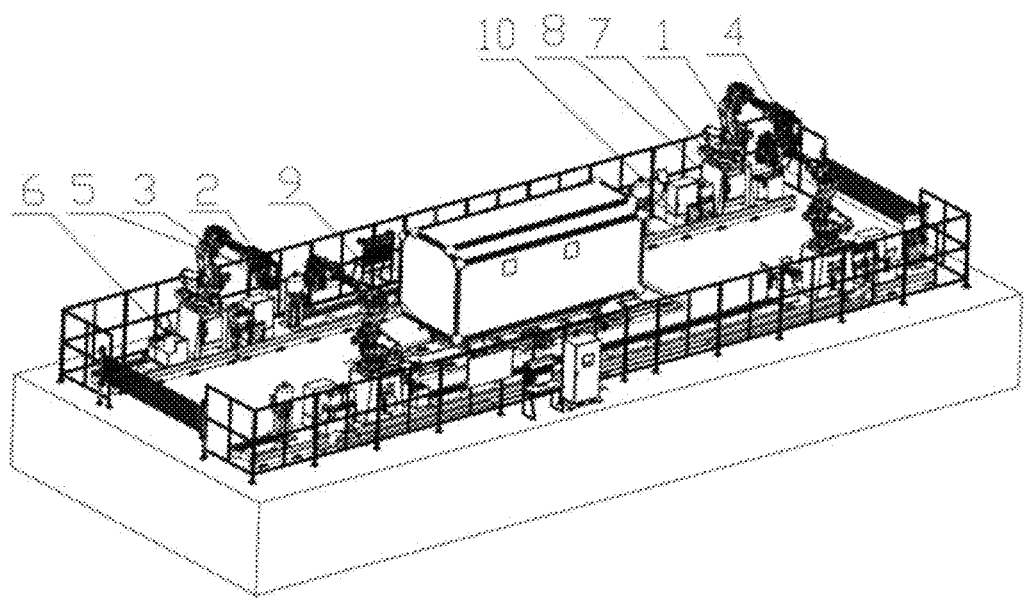
FIG. 1 is a structure diagram of an intelligent drilling and riveting system for a shelter in the present invention.

1, automatic drilling and riveting robot; 2, quick change disc; 3, drilling end executor; 4, riveting and gluing end executor; 5, 3D visual camera; 6, tool changing table; 7, PLC electric control cabinet; 8, fixed bottom plate; 9, shelter transfer vehicle; 10, ground rail of the automatic drilling and riveting robot; 11, spindle; 12, spindle fixing plate; 13, drilling quick change disc; 14, gang drill; 15, glue gun; 16, rivet gun; 17, gluing air cylinder; 18, riveting air cylinder; 19, bracket of gluing and riveting mechanism; 20, quick change disc of gluing and riveting mechanism.

DESCRIPTION OF THE EMBODIMENTS

The technical solution of the present disclosure will be further described below with reference to the drawings.

As shown in FIGS. 1-4, an intelligent drilling and riveting system for a shelter provided by the present invention includes automatic drilling and riveting robots 1, a quick change disc 2, a drilling end executor 3, a riveting and gluing end executor 4, a 3D visual camera 5, a tool changing table 6, a PLC electric control cabinet 7, a fixing bottom plate 8, a shelter transfer vehicle 9 and the ground rail 10 for the automatic drilling and riveting robot. The drilling end executor 3 includes a spindle 11, a spindle fixing plate 12, a drilling quick change disc 13, and a gang drill 14, where the gang drill 14 is clamped to the spindle 11 through a pneumatic chuck inside the spindle and can be driven by the spindle 11 to drill. One end of the spindle fixing plate 12 is screwed and fastened to the spindle 11 and the other end thereof is screwed and fastened to the drilling quick change disc 13, where the gang drill 14 is a drill with four drill bits in one row, and can process four holes at one time. The riveting and gluing end executor 4 includes a glue gun 15, a rivet gun 16, a gluing air cylinder 17, a riveting air cylinder 18, a bracket of a gluing and riveting mechanism, and a quick change disc 20 of the gluing and riveting mechanism, where the rivet gun 16 is screwed and fastened to the riveting air cylinder 18, the glue gun 15 is screwed and fixed to the gluing air cylinder 17, the gluing air cylinder 17 is screwed and fastened to the bracket 19 of the gluing and riveting mechanism, and the other end of the bracket 19 of the gluing and riveting mechanism is screwed and fastened to the quick change disc 20. The riveting and gluing end executor 4 can perform gluing and riveting at the same time. The ground rail 10 of the automatic drilling and riveting robot is fixed to the ground through foundation bolts, the fixing bottom plate 8 can slide along the ground rail 10 of the automatic drilling and riveting robot, the automatic drilling and riveting robot 1 and the tool changing table 6 both are screwed and fixed to the fixing bottom plate, and one end of the ground rail 10 of the automatic drilling and riveting robot is provided with a stopping block as a datum point of the whole system. The quick change disc 2 and the 3D visual camera 5 are screwed and fixed to the end executor of the automatic drilling and riveting robot 1. The drilling end executor 3 and the riveting and gluing end executor 4 can be inserted into the quick change disc 2 rapidly. In actual use, one of the drilling end executor and the riveting and gluing end executor is fixed to the end of the automatic drilling and riveting robot 1 through the drilling quick change disc 13 and the other one is placed on the tool changing table 6 in idle.

Figure 2:
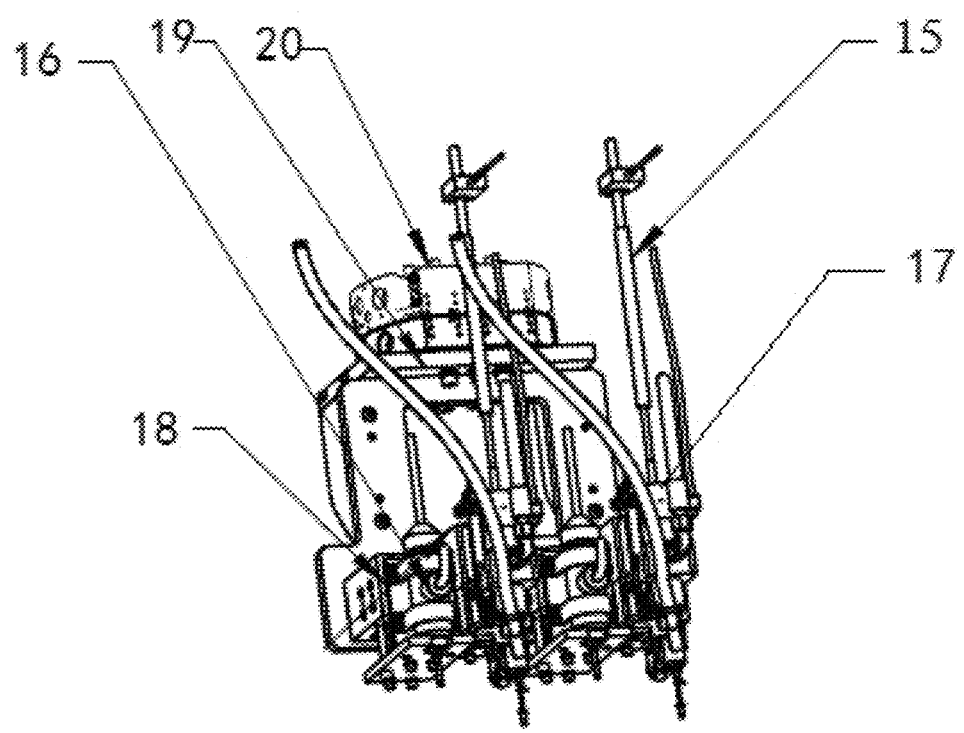
FIG. 2 is a structure diagram I of an end effector drilling and riveting automatically in the present invention.
Figure 3:
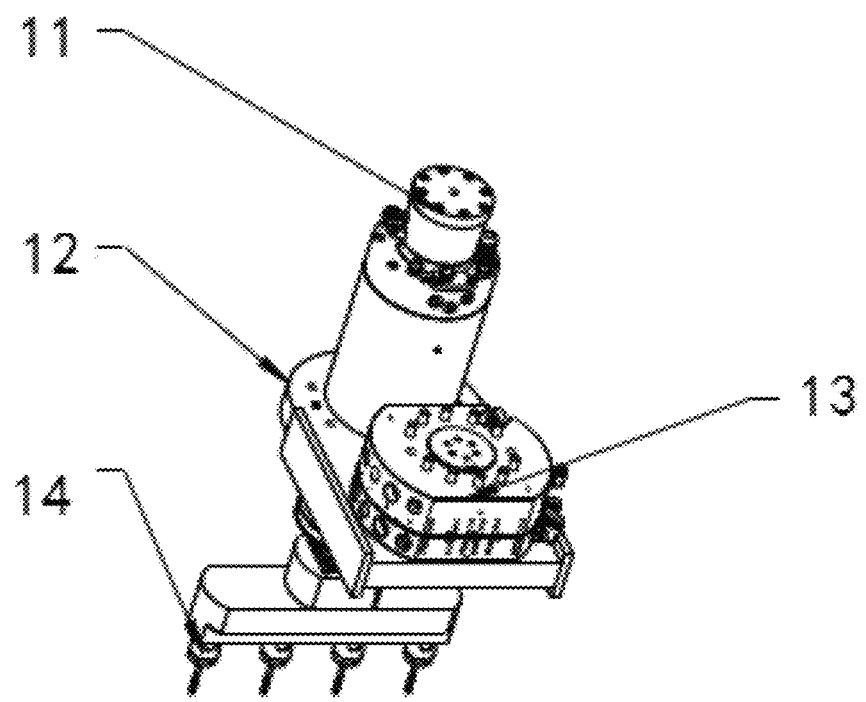
FIG. 3 is a structure diagram I of an end effector drilling and riveting automatically in the present invention.

During an actual operation, as shown in FIG. 2, the four automatic drilling and riveting robots are uniformly distributed at four corners of an automatic drilling and riveting areas of the shelter and are numbered anticlockwise as 1 #, 2 #, 3 #, and 4 #.

Figure 4:
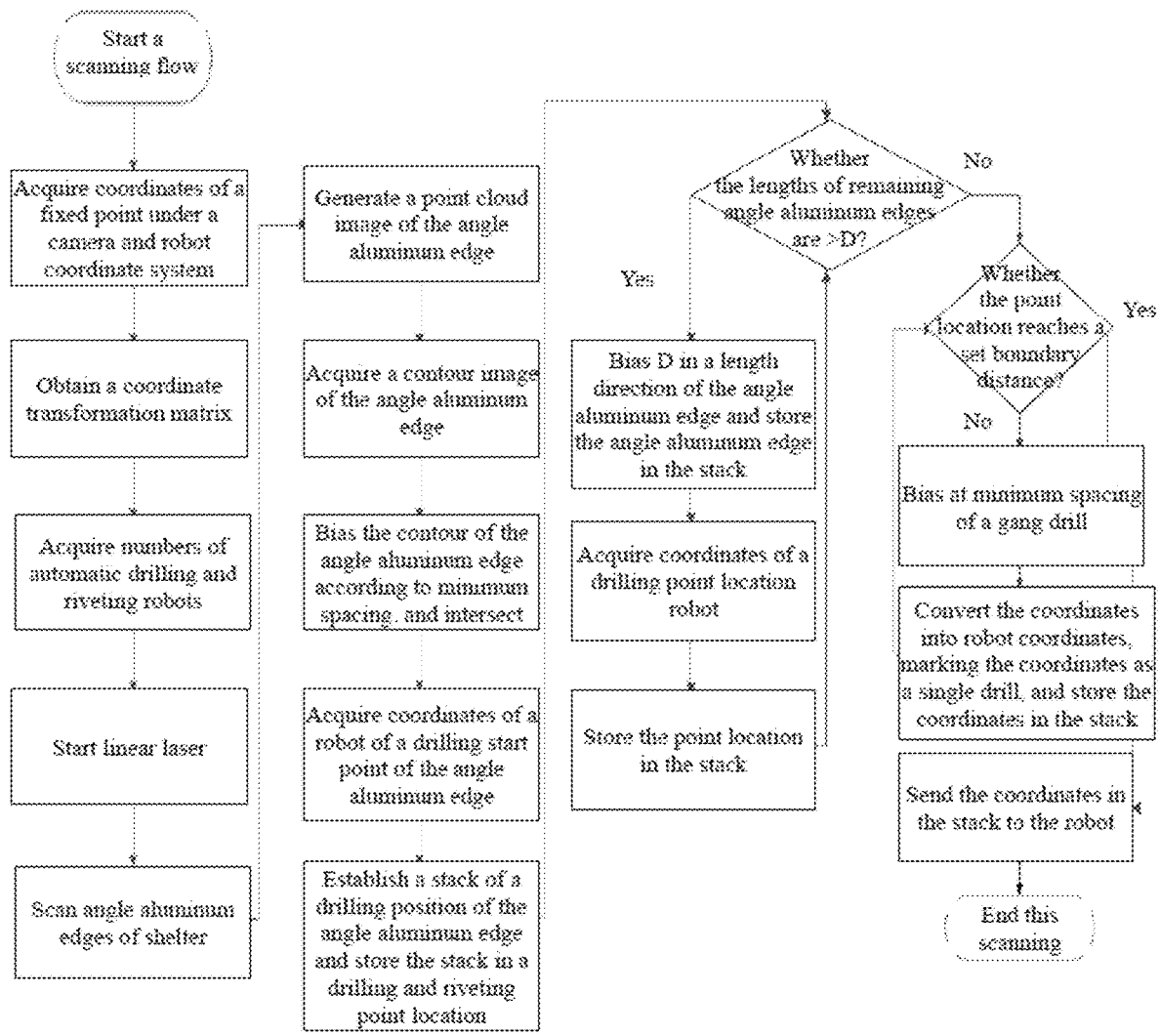
FIG. 4 is a flow diagram where a drilling position of the shelter is captured in the present invention.
Figure 5:
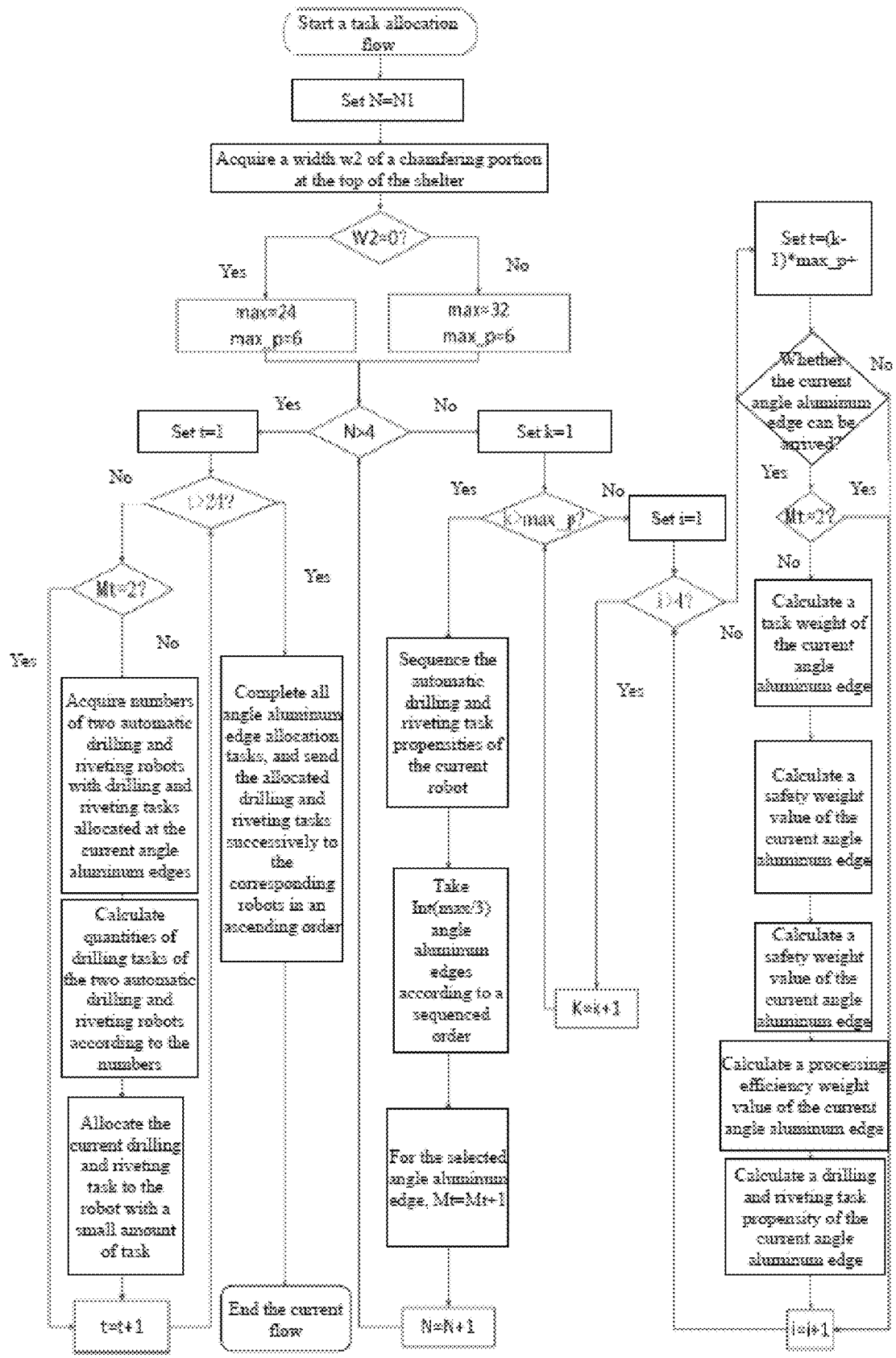
FIG. 5 is a flow diagram of an allocation of drilling and riveting tasks in the present invention.
Figure 6:
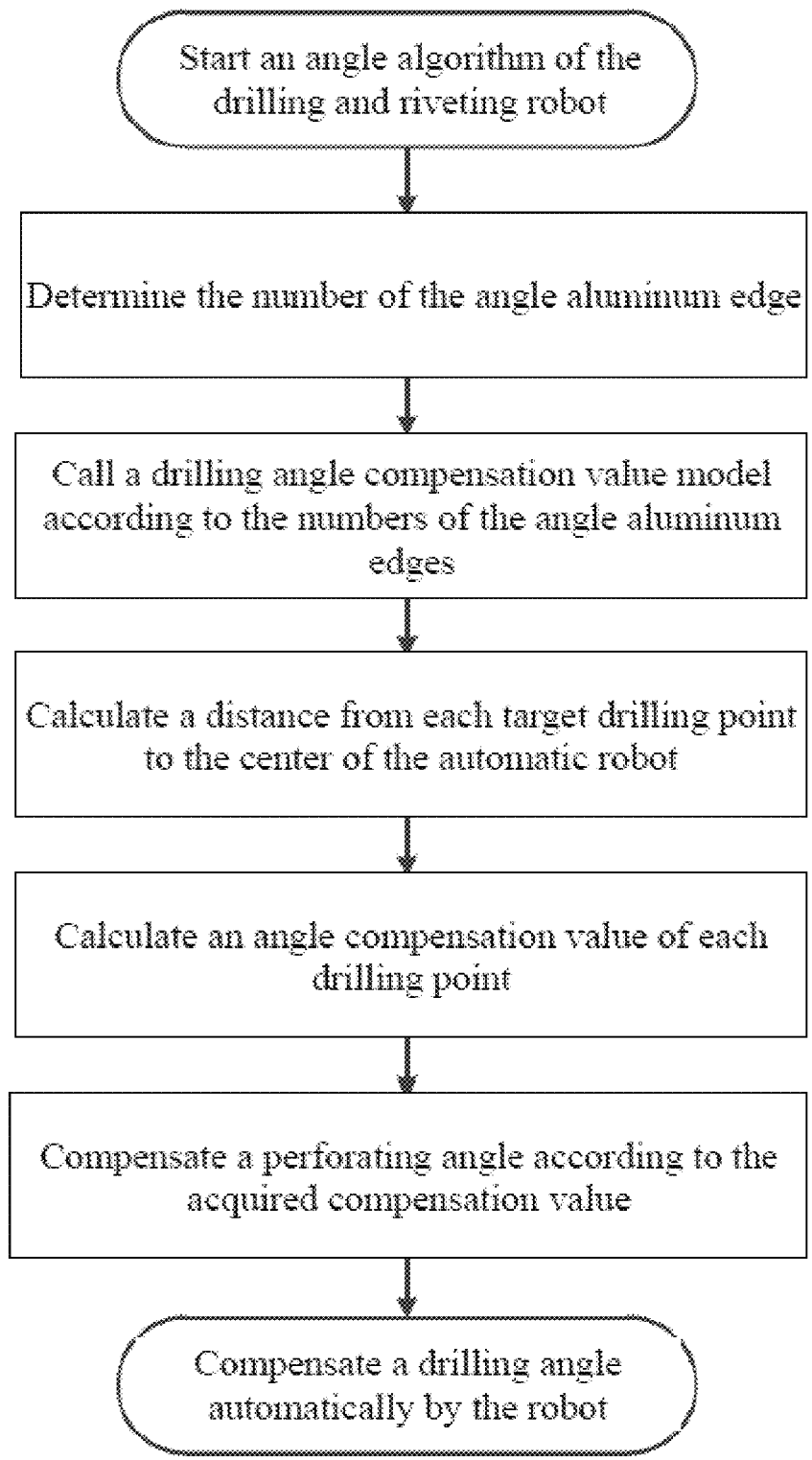
FIG. 6 is a flow diagram of an angle compensation of an automatic drilling and riveting robot in the present invention.

As shown in FIGS. 4-6, a method for controlling a multi-robot collaborating intelligent drilling and riveting system for a shelter provided by the present invention includes the following steps:

generating a robot scanning trace according to a key characteristic parameter of the shelter, where a specific method for generating the robot scanning trace according to the key characteristic parameter of the shelter includes the following steps:

setting the key characteristic parameters of the shelter, the key characteristic parameters of the shelter comprising a length l of the shelter, a width of the shelter $w_1$, a projection width $w_2$ of a chamfered portion at a top of the shelter in a horizontal plane, a height h of the shelter, and a chamfered angle $\theta$ of the shelter, where if the shelter is a right-angled shelter, $w_2=0$;

setting a datum point of the shelter on a robot ground rail as an origin of coordinates, and establishing a coordinate axis by means of a right-handed system; respectively storing end points of the shelter in form of two sets of arrays according to the right-angled shelter and a chamfered shelter;

respectively storing the end points of the shelter are in the form of two sets of arrays according to the right-angled shelter, where the chamfered shelter the right-angled shelter is represented by an array with the capacity of 8 as follows:

$$\begin{bmatrix} (0, 0, 0), (0, 0, h), (w_1, 0, 0), (w_1, 0, h) \\ (0, l, 0), (0, l, h), (w_1, l, 0), (w_1, l, h) \end{bmatrix},$$

the chamfered shelter is represented by an array with the capacity of 12 as follows:

$$\begin{bmatrix} (0, 0, 0), (0, 0, h), (w_1, 0, 0), (w_1, 0, h), (w_2*\cos\theta, 0, h+w_2*\sin\theta), (w_1-w_2*\cos\theta, 0, h+w_2*\sin\theta) \\ (0, l, 0), (0, l, h), (w_1, l, 0), (w_1, l, h), (w_2*\cos\theta, l, h+w_2*\sin\theta), (w_1-w_2*\cos\theta, l, h+w_2*\sin\theta) \end{bmatrix}$$

first, whether the inputted key characteristic parameter $w_2$ of the shelter is 0 is judged, and if the key characteristic parameter is 0, the array of the right-angled shelter is called, or if the key characteristic parameter is not 0, the array of the chamfered shelter is called;

representing a safe scanning distance by $d_{-scan}$, numbering four automatic shelter drilling and riveting robots as 1 #, 2 #, 3 #, and 4 #, and numbering safe points of scanning actions corresponding to the automatic drilling and riveting robots as $O_1$, $O_2$, $O_3$, and $O_4$, and parameterizing the safe points as follows:

$$O_1 = (-d_{-scan}, d_{-scan}, h+w_2*\sin\theta + d_{-scan})$$

$$O_2 = (w1 + d_{-scan}, d_{-scan}, h+w_2*\sin\theta + d_{-scan})$$

-continued $$O_3 = (-d_{-scan}, l+d_{-scan}, h+w_2*\sin\theta + d_{-scan})$$

$$O_4 = (w+d_{-scan}, l+d_{-scan}, h+w_2*\sin\theta + d_{-scan})$$

for parameterized storage of angle aluminum edges, storing 8 faces of the chamfered shelter in the form of an array with a capacity of 8, and storing 6 faces of the right-angled shelter in the form of an array with a capacity of 6; respectively representing the 8 faces and the 6 faces in sequences from front to back, from top to bottom and from left to right as follows:

FACE1: [face$_1$, face$_2$, face$_3$, face$_4$, face$_5$, face$_6$, face$_7$, face$_8$] FACE2: [face$_1$, face$_2$, face$_3$, face$_4$, face$_5$, face$_6$], where there are totally 4 angle aluminum edges for each face of the shelter, which are calibrated as a set of arrays JL: [jl$_1$.jl$_2$, jl$_3$, jl$_4$] in a clockwise direction, and all angle aluminum edges of one chamfered shelter are represented as follows:

$$JL*FACE1 = \begin{bmatrix} jl_1 \\ jl_2 \\ jl_3 \\ jl_4 \end{bmatrix} \bullet [face_1, face_2, face_3, face_4, face_5, face_6, face_7, face_8];$$

all angle aluminum edges of a right-angled shelter are represented as:

$$JL*FACE2 = \begin{bmatrix} jl_1 \\ jl_2 \\ jl_3 \\ jl_4 \end{bmatrix} \bullet [face_1, face_2, face_3, face_4, face_5, face_6],$$

that is, all the angle aluminum edges of a shelter to be polished are stored with jl$_1$ face1, jl$_1$ face2 . . . , and any one angle aluminum edge is represented as jlifacek, where values of i and k are $$\begin{cases} i \in [1, 4], k \in [1, 8]; & w_2 \neq 0 \\ i \in [1, 4], k \in [1, 6]; & w_2 = 0 \end{cases};$$

judging whether the inputted key characteristic parameter $w_2$ of the shelter is 0, if $w_2=0$, it indicates that the shelter is the right-angled shelter with 6 face$_5$, and a maximum value of k is 6; or if $w_2 \neq 0$, it indicates that the shelter has 8 face$_5$, and a maximum value of k is 8;

acquiring a scanning vector of the robot through coordinate differences of the end points of the shelter, generating the scanning trace of the robot, that is, driving, by the robot, a camera coordinate system to start from the safe point of the scanning action along the scanning vector parallel to the angle aluminum edge to be scanned to successively traverse all angle aluminum edges, and storing the scanning traces of the angle aluminum edges corresponding to each robot in the form of the structure array, where a capacity of the struct array is a maximum quantity of the angle aluminum edges, a maximum quantity of the angle aluminum edges of the chamfered shelter is 32, a maximum quantity of the angle aluminum edges of the right-angled shelter is 24, and each struct element in an array includes the following patterns:

```
STRUCT{
Vector a //defining the scanning vector
    INT  N //defining the numbers of the robots
    CString code //defining the numbers of the angle aluminum edges
    }.
```

(2) performing laser scanning on the angle aluminum edge to acquire a drilling position of the shelter;

the performing laser scanning on the angle aluminum edge to acquire a drilling position of the shelter specifically includes the following steps:

(2.1) selecting n fixed points P within an arrival range of an N #N∈ [1, 4]$^{th}$ automatic drilling and riveting robot, to acquire corresponding coordinates P_robot and P_camera of the fixed points P in the camera coordinate system and the robot coordinate system, respectively;

(2.2) acquiring a coordinate transformation matrix T=P_robot*(P_camra)$^{-1}$ through P_robot=T*P_camera;

(2.3) sending, by the automatic drilling and riveting robot, a character string to a 3D visual camera, and parsing, by the 3D visual camera, the character string to acquire the number of the automatic drilling and riveting robot;

(2.4) starting, by the 3D visual camera, linear laser, and scanning, by the automatic drilling and riveting robot according to the scanning trace, an area where the angle aluminum is installed at an edge of the shelter;

(2.5) differentiating, by the 3D visual camera, the angle aluminum edge from aluminum skin of the shelter according to a height difference of laser reflected in the scanning process, and generating a point cloud image of the angle aluminum edge;

(2.6) extracting boundary points of the point cloud image of the angle aluminum edge and coordinates thereof, and eliminating noisy points in the point cloud image;

(2.7) successively connecting the extracted boundary points end to end clockwise to acquire a contour image of the angle aluminum edge;

(2.8) biasing a width direction of the contour image of the angle aluminum edge according to a set minimum distance Δ1 from a rivet to an edge of a length direction of the angle aluminum edge, and biasing the length direction of the contour image of the angle aluminum edge according to a minimum distance Δ2 from the rivet to an edge of a width direction of the angle aluminum edge;

(2.9) calculating an intersection point of two biased straight lines as a drilling starting position of the angle aluminum edge;

(2.10) establishing a stack for storing a drilling position at the angle aluminum edge;

(2.11) converting the drilling starting point in the camera coordinate system into a coordinate position of the automatic drilling and riveting robot through the coordinate transformation matrix T, and storing the coordinate position at a bottom of the stack;

(2.12) judging whether a length of a remaining angle aluminum edge is less than a maximum spacing 3*D between drill bits of a gang drill, and if the length of the remaining angle aluminum edge is less than the maximum spacing, skipping to (2.13), or if the length of the remaining angle aluminum edges is not less than the maximum spacing, skipping to (2.14);

(2.13) performing biasing according to the maximum spacing 3*D between drill bits of a gang drill in the length direction to acquire a drilling position of the gang drill for the angle aluminum edge, and converting the drilling position into coordinates of the automatic drilling and riveting robot;

(2.14) marking a current point processing method as the gang drill, and storing current point locations in the stack;

(2.15) judging whether a set boundary distance of the angle aluminum edge has been reached, and if the set boundary distance of the angle aluminum edge has been reached, skipping to (2.16), or if the set boundary distance of the angle aluminum edge has not been reached, skipping to (2.17);

(2.16) performing biasing with a minimum hole spacing D of gang drill, and converting the drilling starting point in the camera coordinate system into the coordinate position of the automatic drilling and riveting robot;

(2.17) marking the current point processing method as a single drill, storing the current point locations in the stack, and skipping to (2.15); and (2.18) sending coordinates of points in the stack to the automatic drilling and riveting robot in a first-in last-out sequence, and using the coordinates as position points for perforating, and ending a scanning flow.

(3) establishing a task allocation mechanism, establishing a drilling and riveting task propensity model according to the task allocation mechanism, and allocating automatic drilling and riveting tasks to multiple robots based on the drilling and riveting task propensity model; and The task allocation mechanism includes: each automatic drilling and riveting robot processes an angle aluminum edge of the shelter needed to be drilled and riveted at most preferably, that is, the robot selects the angle aluminum edge with a greatest number of holes to be drilled first; each automatic drilling and riveting robot avoids interference with or waiting other robots, that is, the robot selects a path with a smallest interference area with other robots preferably; each automatic drilling and riveting robot abandons an angle aluminum edge of the shelter with high self-motion complexity, that is, the robot selects an angle aluminum edge with a least total amount of motion of joints of the robot and the shortest total motion time; and drilling and riveting of each angle aluminum edge is completed by two automatic drilling and riveting robots at most.

The drilling and riveting task propensity model is as follows:

$$F_K = \alpha_1 M_t - \alpha_2 T_t - \alpha_3 S_t$$

where $\alpha_1$ is a work task weight coefficient with a value interval of [1,2], $$M_t = \frac{INT(L_t/d\Delta)}{\left(\sum_{t=0}^{max}(L_t/d\Delta)\right)/max},$$

$M_t$ is a quantity of holes to be drilled in a $t^{th}$ angle aluminum edge, $INT(L_t/d\Delta)$; is proportional rounding of a length $L_t$ of the angle aluminum edge and a hole spacing $d\Delta$ from the length, max is a total quantity of the angle aluminum edges, max of the chamfered shelter is 32, and max of the right-angled shelter is 24;

$\alpha_2$ is a safety weight coefficient, with a value interval of [0.5,1], $T_t$ is a ratio of a length $R_t$ of an overlapped arrival area between a current angle aluminum edge and other robots to a length $L_t$ of the current angle aluminum edge, that is, $T_t=R_t/L_t$;

$\alpha_3$ is an efficiency weight coefficient, with a value interval of [0.2, 0.5], $$S_t = \frac{A_t}{\left(\sum_{t=0}^{total} A_t\right)/total},$$

where $A_t$ is total time when the current automatic drilling and riveting robot completes a current angle aluminum edge operation:

$$A_t = A_{safe1\_t} + A_{sm\_t} + A_{safe2\_t} + A_{hd\_t} + A_{safe3\_t} + A_{dk\_t} + A_{hd2\_t} + A_{safe4\_t} + A_{tm\_t} + A_{wait\_t}$$

where $A_{safe1\_t}$ is time for the robot from the safe point to a scanning start point, $A_{sm\_t}$ is scanning time, $A_{safe2\_t}$ is time from a scanning end point to the safe point, $A_{hd\_t}$ is tool changing time, $A_{safe3\_t}$ is time from a tool changing point to the safe point, $A_{dk\_t}$ is perforating time, $A_{hd2\_t}$ is time when a gluing and riveting tool end is changed, $A_{safe4\_t}$ is time from a tool changing point of a gluing and riveting module to the safe point, $A_{tm\_t}$ is time when gluing and riveting are executed, $A_{wait\_t}$ is wait time, and total is a total quantity of the angle aluminum edges judged to be arrived by the current robot.

The allocating automatic drilling and riveting tasks to multiple robots specifically includes the following steps:

(3.1) initialization: setting a serial number label N=1 of the automatic drilling and riveting robot, and setting number-of-times labels $M_t=1$ of all angle aluminum edges to be drilled and riveted;

(3.2) acquiring the inputted projection width $w_2$ of the chamfering portion at the top of the shelter in the horizontal plane;

(3.3) judging whether $w_2$ is 0, where if $w_2$ is 0, skipping to (3.4), or if $w_2$ is not 0, skipping to (3.5);

(3.4) setting a maximum quantity max of the angle aluminum edges to 24 and a maximum plane quantity max_p to 6;

(3.5) setting a maximum quantity max of the angle aluminum edges to 32 and a maximum plane quantity max_p to 8;

(3.6) judging whether N is >4, where if N is not >4, skipping to (3.7), and if N is >4, skipping to (3.26);

(3.7) setting k=1;

(3.8) judging whether k is >max_p, where if k is not >max_p, skipping to (3.9), or if k is >max_p, skipping to (3.23);

(3.9) setting i=1;

(3.10) judging whether i is >4, where if i is not >4, skipping to (3.11), and if i is >4, skipping to (3.22);

(3.11) setting t=(k−1)*max_p+i;

(3.12) judging whether an N #$^{th}$ automatic drilling and riveting robot arrives at the $t^{th}$ angle aluminum edge, where if the N #$^{th}$ automatic drilling and riveting robot arrives at the $t^{th}$ angle aluminum edge, skipping to (3.13), or if the N #$^{th}$ automatic drilling and riveting robot does not arrive at the $t^{th}$ angle aluminum edge, skipping to (3.21);

(3.13) judging whether the number-of-times label of the current angle aluminum edge to be drilled and riveted is $M_t=2$?, where if the number-of-times label of the current angle aluminum edge to be drilled and riveted is $M_t=2$?, skipping to (3.14), or if the number-of-times label of the current angle aluminum edge to be drilled and riveted is not $M_t=2$?, skipping to (3.21);

(3.14) substituting set values of the length of the current angle aluminum edge and a perforating spacing into $INT(L_t/d\Delta)$;

(3.15) calculating a work task weight $$M_t = \frac{INT(L_t/d\Delta)}{\left(\sum_{t=0}^{max}(L_t/d\Delta)\right)/max}$$

of the current angle aluminum edge;

(3.16) calculating a length $L_t$ of an overlapped arrival area between the current drilling and riveting robot and remaining automatic drilling and riveting robots in an operation process of the current angle aluminum edge;

(3.17) calculating a safety weight coefficient $T_t=R_t/L_t$ of the current angle aluminum edge;

(3.18) calculating operation time $A_t=A_{safe1\_t}+A_{sm\_t}+A_{safe2\_t}+A_{hd\_t}+A_{safe3\_t}+A_{dk\_t}+A_{hd2\_t}+A_{safe4\_t}+A_{tm\_t}+A_{wait\_t}$ for the current drilling and riveting robot at the current angle aluminum edge;

(3.19) calculating a processing efficiency weight coefficient $$S_t = \frac{A_t}{\left(\sum_{t=0}^{total} A_t\right)/total}$$

of the current angle aluminum edge;

(3.20) substituting the processing efficiency weight value into the drilling and riveting task propensity model, to $F_K=\alpha 1M_t-\alpha 2T_t-\alpha 3A_t$ calculate a drilling and riveting task propensity of the current angle aluminum edge;

(3.21) i=i+1, skipping to (3.9);

(3.22) k=k+1, skipping to (3.8);

(3.23) sequencing the drilling and riveting task propensity of the current automatic drilling and riveting robot on all angle aluminum edges in a descending order;

(3.24) taking Int(max/3) angle aluminum edges from all angle aluminum edges according to a sequencing result, and setting the number-of-time s label of the angle aluminum to be drilled and riveted of the angle aluminum edges to $M_t=M_t+1$.

(3.25) N=N+1, skipping to (3.6);

(3.26) setting s=1;

(3.27) judging whether s is >max_p, where if s is >max_p, skipping to (3.28) and if s is not >max_p, skipping to (3.33);

(3.28) judging whether the $t^{th}$ angle aluminum edge $M_t$ is >2, where if the $t^{th}$ angle aluminum edge is not >2, skipping to (3.32), or if the $t^{th}$ angle aluminum edge is >2, skipping to (3.29);

(3.29) acquiring the numbers of two automatic drilling and riveting robots with drilling and riveting tasks allocated at the current angle aluminum edges;

(3.30) calculating quantities $\Sigma(L_z/d\Delta)$ of drilling tasks allocated to the current two automatic drilling and riveting robots;

(3.31) comparing the quantities of the drilling tasks allocated to the two automatic drilling and riveting robots, allocating a drilling task to an automatic drilling and riveting robot with a relatively small quantity of drilling tasks, where if the quantities of the tasks for the two automatic drilling and riveting robots are the same, the task is allocated to the automatic drilling and riveting robot with a relatively small number by default;

(3.32) s=s+1, skipping to (3.27); and (3.33) completing allocation of all tasks to the automatic drilling and riveting robots, and sending all allocated drilling and riveting tasks to corresponding automatic drilling and riveting robots according to the stored numbers of the automatic drilling and riveting robots, and starting to execute, by the automatic drilling and riveting robots, automatic drilling and riveting operations in a descending order according to the stored drilling and riveting task propensities.

(4) establishing a drilling angle compensation value model, where the automatic drilling and riveting robots perform position compensation based on the drilling angle compensation value model to finish drilling and riveting.

The establishing the drilling angle compensation value model specifically includes the following steps:

establishing a numerical value model for a compensation value and a distance from a drilling point of the angle aluminum edge of the shelter to a center of the automatic drilling and riveting robot at jlifacek of each angle aluminum edge of the shelter:

$$C(t) = \frac{x1t^2 + x2\exp(x3t)}{t},$$

where C is a system compensation value of each automatic drilling and riveting robot, t is a distance from the automatic drilling and riveting robot to a drilling central point, and x1, x2, and x3 are parameters to be determined;

by operating the automatic drilling and riveting robot to perform a drilling test on the angle aluminum edge at the jlifacek, acquiring a distance of a drilled hole deviated from a set numerical value and a distance from the automatic drilling and riveting robot to the drilling central point, so as to establish a parameter acquisition and optimization model of the numerical value model for the distance from the drilling point of the angle aluminum edge of the shelter to the center of the automatic drilling and riveting robot:

$$\begin{cases} \min S(X) \triangleq \sum_{m=1}^{20} |f(t_i, X) - c_i| \\ f(t_i, X) = \frac{x_1 t_m^2 + x_2 \exp(x_3 t_m)}{t_m}, m = 1, 2, 3 \ldots 20 \end{cases};$$

and substituting data into the equations to obtain an optimal solution $X(x_1, x_2, x_3)$ of each set of compensation value coefficients, so as to acquire the drilling angle compensation value model during automatic drilling and riveting of the angle aluminum edge, and repeating the steps until compensation value models for all angle aluminum edges are acquired.

The performing position compensation specifically includes the following steps:

(4.1) determining the number of the angle aluminum edge;

(4.2) calling the drilling angle compensation value model during automatic drilling and riveting at the angle aluminum edges according to the numbers of the angle aluminum edges;

(4.3) calculating a distance from each target drilling point to the center of the automatic drilling and riveting robot according to a result obtained by scanning;

(4.4) substituting the distance from each target drilling point to the center of the automatic drilling and riveting robot into the compensation value model to acquire angle compensation values of all drilling points and storing the angle compensation values; and (4.5) compensating the drilling angles according to the acquired compensation values.

The intelligent drilling and riveting system for a shelter includes the automatic drilling and riveting robots, a quick change disc, a drilling end executor, a riveting and gluing end executor, a 3D visual camera, a tool changing table, a PLC electric control cabinet, a robot bottom plate, a shelter transfer vehicle and the robot ground rail, and there are totally 4 automatic drilling and riveting robots numbered as 1 #, 2 #, 3 #, and 4 #.

A specific task execution process of the method for controlling a multi-robot collaborating intelligent drilling and riveting system for a shelter in the present invention includes:

The key characteristic parameters of the angle aluminum edges are input into the PLC electric control cabinet 7, key characteristic parameterization of the shelter is established, and the scanning traces of the angle aluminum edges of each automatic drilling and riveting robot are generated based on the scanning traces generated based on the key characteristic parameterization of the shelter and are stored; the drilling and riveting tasks are automatically allocated for the multiple drilling and riveting robots, and the drilling and riveting tasks to be executed by each automatic drilling and riveting robot are acquired; the 1 #, 2 #, 3 #and 4 #automatic drilling and riveting robots 1 start to execute the automatic drilling and riveting task of the angle aluminum edges with the highest drilling and riveting task propensities according to a calculation result of the drilling and riveting task propensity model of each angle aluminum edge; the automatic drilling and riveting robot 1 drives the 3D visual camera 5 to acquire the drilling position of the shelter, stores the drilling hole site of the shelter captured in a stack manner, compensates the drilling hole site, and moves to the tool change disc 6. By rapidly linking the quick change disc 3 and the drilling change disc 13, the drilling end executor 3 is picked up, and the automatic drilling and riveting robot 1 drives the end executor 3 to drill successively according to the drilling hole sites out of the stack till drilling of all hole bits is completed according to a principle of last-in first-out of the stack. The automatic drilling and riveting robot 1 drives the drilling end executor 3 to move to the tool changing table to replace the gluing and riveting end executor 4, and the drilling end executor is then driven by the automatic drilling and riveting robot to move to the drilling hole bit again, so as to execute the gluing and riveting action through the gluing and riveting end executor 4. In the automatic gluing process, the gluing air cylinder 17 drives the glue gun 15 to glue a previous hole first, and the riveting air cylinder 18 drives the rivet gun 16 to rivet the next glued hole, and the two operate at the same time, so that the operation efficiency is improved. Reciprocating is performed successively till each automatic drilling and riveting robot 1 completes the drilling and riveting task allocated thereto. The flow is ended. All automatic drilling and riveting work of the whole set of shelter is completed. Finally, the method for controlling the multi-automatic drilling and riveting robot collaborating intelligent drilling and riveting system for the shelter is achieved, so that the angle aluminum of the shelter is efficiently, safely, and intelligently installed in an unmanned manner.

The present invention provides a method for controlling a multi-robot collaborating intelligent drilling and riveting system for a shelter. The above examples are merely the preferred embodiments of the present invention. It shall be noted that those of ordinary skill in the art can further make several improvements and embellishments without departing from the principle of the present invention, and these improvements and embellishments shall be regarded as the protection scope of the present invention. Various components not specified in the present example can all be implemented through the existing technology.

What is claimed is:

1. A method for controlling a multi-robot collaborating intelligent drilling and riveting system for a shelter, comprising the following steps:
   (1) generating a robot scanning trace according to a key characteristic parameter of the shelter,
   a specific method for generating the robot scanning trace according to the key characteristic parameter of the shelter in step (1) comprises the following steps:
   the key characteristic parameters of the shelter comprising a length l of the shelter, a width $w_1$ of the shelter, a projection width $w_2$ of a chamfered portion at a top of the shelter in a horizontal plane, a height h of the shelter, and a chamfered angle θ of the shelter, wherein if the shelter is a right-angled shelter, $w_2=0$;
   setting a datum point of the shelter on a robot ground rail as an origin of coordinates, and establishing a coordinate axis by means of a right-handed system; respectively storing end points of the shelter in form of two sets of arrays according to the right-angled shelter and a chamfered shelter;
   representing a safe scanning distance by $d_{-scan}$, numbering four automatic shelter drilling and riveting robots as #1, #2, #3, and #4, and numbering safe points of scanning actions corresponding to the automatic drilling and riveting robots as $O_1$, $O_2$, $O_3$, and $O_4$, and parameterizing the safe points as follows:

$$O_1 = \left(-d_{-scan}, d_{-scan}, h + w_2 * \sin\theta + d_{-scan}\right)$$

$$O_2 = \left(w1 + d_{-scan}, d_{-scan}, h + w_2 * \sin\theta + d_{-scan}\right)$$

$$O_3 = \left(-d_{-scan}, l + d_{-scan}, h + w_2 * \sin\theta + d_{-scan}\right)$$

$$O_4 = \left(w + d_{-scan}, l + d_{-scan}, h + w_2 * \sin\theta + d_{-scan}\right)$$

for parameterized storage of angle aluminum edges, storing 8 faces of the chamfered shelter in the form of an array with a size of 8, and storing 6 faces of the right-angled shelter in the form of an array with a size of 6; respectively representing the 8 faces and the 6 faces in sequences from front to back, from top to bottom and from left to right as follows:
FACE1: [face$_1$, face$_2$, face$_3$, face$_4$, face$_5$, face$_6$, face$_7$, face$_8$], FACE2: [face$_1$, face$_2$, face$_3$, face$_4$, face$_5$, face$_6$], there is a total of 4 angle aluminum edges for each face of each shelter, which are calibrated as a set of arrays JL: [jl$_1$,jl$_2$, jl$_3$, jl$_4$] in a clockwise direction, and all angle aluminum edges of one chamfered shelter are represented as follows:

$$JL * FACE1 = \begin{bmatrix} jl_1 \\ jl_2 \\ jl_3 \\ jl_4 \end{bmatrix} \cdot [\text{face}_1, \text{face}_2, \text{face}_3, \text{face}_4, \text{face}_5, \text{face}_6, \text{face}_7, \text{face}_8];$$

all angle aluminum edges of a right-angled shelter are represented as $$JL * FACE2 = \begin{bmatrix} jl_1 \\ jl_2 \\ jl_3 \\ jl_4 \end{bmatrix} \cdot [\text{face}_1, \text{face}_2, \text{face}_3, \text{face}_4, \text{face}_5, \text{face}_6],$$

that is, all the angle aluminum edges of a shelter to be polished are stored with jl$_1$ face$_1$, jl$_1$ face$_2$ ..., and any one angle aluminum edge is represented as jlifacek, wherein values of i and k are $$\begin{cases} i \in [1, 4], k \in [1, 8]; & w \neq 0 \\ i \in [1, 4], k \in [1, 6]; & w = 0 \end{cases};$$

judging whether the inputted key characteristic parameter $w_2$ of the shelter is 0, if $w_2=0$, it indicates that the shelter is the right-angled shelter with 6 face$_s$, and a maximum value of k is 6; or if $w_2 \neq 0$, it indicates that the shelter has 8 face$_s$, and a maximum value of k is 8;
acquiring a scanning vector of the robot through coordinate differences of the end points of the shelter, generating the scanning trace of the robot, that is, driving, by the robot, a camera coordinate system to start from the safe point of the scanning action along the scanning vector parallel to the angle aluminum edge to be scanned to successively traverse all angle aluminum edges, and storing the scanning traces of the angle aluminum edges corresponding to each robot in the form of a struct array, a capacity of the struct array is a maximum quantity of the angle aluminum edges, a maximum quantity of the angle aluminum edges of the chamfered shelter is 32, a maximum quantity of the angle aluminum edges of the right-angled shelter is 24, and each struct element in an array comprises the following patterns:

```
STRUCT{
Vector a //defining the scanning vector
    INT  N //defining the numbers of the robots
    CString code //defining the numbers of the angle aluminum edges
};
```

(2) performing linear laser scanning on the angle aluminum edge to acquire a drilling position of the shelter;

(3) establishing a task allocation mechanism, establishing a drilling and riveting task propensity model according to the task allocation mechanism, and allocating automatic drilling and riveting tasks to multiple robots based on the drilling and riveting task propensity model;

(4) establishing a drilling angle compensation value model, the automatic drilling and riveting robots perform position compensation based on the drilling angle compensation value model to finish drilling and riveting;

establishing the drilling angle compensation value model in step (4) specifically comprises the following steps:

establishing a numerical value model for a compensation value and a distance from a drilling point of the angle aluminum edge of the shelter to a center of the automatic drilling and riveting robot at jlifacek of each angle aluminum edge of the shelter:

$$C(t) = \frac{x1t^2 + x2\exp(x3t)}{t},$$

wherein C is a system compensation value of each automatic drilling and riveting robot, t is a distance from the automatic drilling and riveting robot to a drilling central point, and $x_1$, $x_2$, and $x_3$ are parameters to be determined;

by operating the automatic drilling and riveting robot to perform a drilling test on the angle aluminum edge at the jlifacek, acquiring a distance of a drilled hole deviated from a set numerical value and a distance from the automatic drilling and riveting robot to the drilling central point, so as to establish a parameter acquisition and optimization model of the numerical value model for the distance from the drilling point of the angle aluminum edge of the shelter to the center of the automatic drilling and riveting robot:

$$\begin{cases} \min S(X) \triangleq \sum_{m=1}^{20} |f(t_i, X) - c_i| \\ f(t_i, X) = \frac{x_1 t_m^2 + x_2 \exp(x_3 t_m)}{t_m}, m = 1, 2, 3 \ldots 20 \end{cases};$$

substituting data into the equations to obtain an optimal solution $X(x_1, x_2, x_3)$ of each set of compensation value coefficients, so as to acquire the drilling angle compensation value model during automatic drilling and riveting of the angle aluminum edge, and repeating the steps until compensation value models for all angle aluminum edges are acquired.

2. The method for controlling the multi-robot collaborating intelligent drilling and riveting system for the shelter according to claim 1, wherein the end points of the shelter are respectively stored in the form of two sets of arrays according to the right-angled shelter and the chamfered shelter, and the right-angled shelter is represented by the array with the capacity of 8 as follows:

$$\begin{bmatrix} (0, 0, 0), (0, 0, h), (w_1, 0, 0), (w_1, 0, h) \\ (0, l, 0), (0, l, h), (w_1, l, 0), (w_1, l, h) \end{bmatrix},$$

the chamfered shelter is represented by the array with the capacity of 12 as follows:

$$\begin{bmatrix} (0, 0, 0), (0, 0, h), (w_1, 0, 0), (w_1, 0, h), \\ (w_2 * \cos\theta, 0, h + w_2 * \sin\theta), (w_1 - w_2 * \cos\theta, 0, h + w_2 * \sin\theta) \\ (0, l, 0), (0, l, h), (w_1, l, 0), (w_1, l, h), \\ (w_2 * \cos\theta, l, h + w_2 * \sin\theta), (w_1 - w_2 * \cos\theta, l, h + w_2 * \sin\theta) \end{bmatrix}$$

first, whether the inputted key characteristic parameter $w_2$ of the shelter is 0 is judged, if the key characteristic parameter is 0, the array of the right-angled shelter is called, or if the key characteristic parameter is not 0, the array of the chamfered shelter is called.

3. The method for controlling the multi-robot collaborating intelligent drilling and riveting system for the shelter according to claim 1, wherein performing linear laser scanning on the angle aluminum edge to acquire the drilling position of the shelter in step (2) specifically comprises the following steps:

(2.1) selecting n fixed points P within an arrival range of an $N^{th}$ automatic drilling and riveting robot, $N \in [1,4]$, to acquire corresponding coordinates P_robot and P_camera of the fixed points P in the robot coordinate system and the camera coordinate system, respectively;

(2.2) acquiring a coordinate transformation matrix $T = P\_robot*(P\_camera)^{-1}$ through $P\_robot = T*P\_camera$;

(2.3) sending, by the automatic drilling and riveting robot, a character string to a 3D visual camera, and parsing, by the 3D visual camera, the character string to acquire the number of the automatic drilling and riveting robot;

(2.4) starting, by the 3D visual camera, linear laser, and scanning, by the automatic drilling and riveting robot according to the scanning trace, an area where the angle aluminum edge is installed at an edge of the shelter;

(2.5) differentiating, by the 3D visual camera, the angle aluminum edge from aluminum skin of the shelter according to a height difference of laser reflected in the scanning process, and generating a point cloud image of the angle aluminum edge;

(2.6) extracting boundary points of the point cloud image of the angle aluminum edge and coordinates thereof, and eliminating noisy points in the point cloud image;

(2.7) successively connecting the extracted boundary points end to end clockwise to acquire a contour image of the angle aluminum edge;

(2.8) biasing a width direction of the contour image of the angle aluminum edge according to a set minimum distance Δ1 from a rivet to an edge of a length direction of the angle aluminum edge, and biasing the length direction of the contour image of the angle aluminum edge according to a set minimum distance Δ2 from the rivet to an edge of the width direction of the angle aluminum edge;

(2.9) calculating an intersection point of two biased straight lines as a drilling starting position of the angle aluminum edge;

(2.10) establishing a stack for storing a drilling position at the angle aluminum edge;

(2.11) converting the drilling starting point in the camera coordinate system into a coordinate position of the automatic drilling and riveting robot through the coordinate transformation matrix T, and storing the coordinate position at a bottom of the stack;

(2.12) judging whether a length l of a remaining angle aluminum edge is less than a maximum spacing 3*D between drill bits of a gang drill, and if the length l of the remaining angle aluminum edge is less than the maximum spacing, skipping to (2.13), or if the length l of the remaining angle aluminum edges is not less than the maximum spacing, skipping to (2.14);

(2.13) performing biasing according to the maximum spacing 3*D between drill bits of a gang drill in the length direction to acquire a drilling position of the gang drill for the angle aluminum edge, and converting the drilling position into coordinates of the automatic drilling and riveting robot;

(2.14) marking a current point processing method as the gang drill, and storing current point locations in the stack;

(2.15) judging whether a set boundary distance of the angle aluminum edge has been reached, and if the set boundary distance of the angle aluminum edge has been reached, skipping to (2.16), or if the set boundary distance of the angle aluminum edge has not been reached, skipping to (2.17);

(2.16) performing biasing with a minimum hole spacing D of gang drill, and converting the drilling starting point in the camera coordinate system into the coordinate position of the automatic drilling and riveting robot;

(2.17) marking the current point processing method as a single drill, storing the current point locations in the stack, and skipping to (2.15);

(2.18) sending coordinates of points in the stack to the automatic drilling and riveting robot in a first-in last-out sequence, and using the coordinates as position points for perforating, and ending a scanning flow.

4. The method for controlling the multi-robot collaborating intelligent drilling and riveting system for the shelter according to claim 1, wherein the task allocation mechanism in step (3) comprises: each automatic drilling and riveting robot processes an angle aluminum edge of the shelter needed to be drilled and riveted at most first, that is, the robot selects the angle aluminum edge with a greatest number of holes to be drilled first; each automatic drilling and riveting robot avoids interference with or waiting other robots, that is, the robot selects a path with a smallest interference area with other robots first; each automatic drilling and riveting robot abandons an angle aluminum edge of the shelter with high self-motion complexity, that is, the robot selects an angle aluminum edge with a least total amount of motion of joints of the robot and the shortest total motion time; and drilling and riveting of each angle aluminum edge is completed by two automatic drilling and riveting robots at most.

5. The method for controlling the multi-robot collaborating intelligent drilling and riveting system for the shelter according to claim 4, wherein the drilling and riveting task propensity model in step (3) is as follows:

$$F_K = \alpha_1 M_t - \alpha_2 T_t - \alpha_3 S_t$$

wherein $\alpha_1$ is a work task weight coefficient with a value interval of [1,2], $$M_t = \frac{INT(L_t/d\Delta)}{\left(\sum_{t=0}^{max}(L_t/d\Delta)\right)/max},$$

wherein $M_t$ is a quantity of holes to be drilled in a $t^{th}$ angle aluminum edge, $INT(L_t/d\Delta)$ is proportional rounding of a length $L_t$ of the angle aluminum edge and a hole spacing $d\Delta$ from the length, max is a total quantity of the angle aluminum edges, wherein max of the chamfered shelter is 32, and max of the right-angled shelter is 24;

$\alpha_2$ is a safety weight coefficient, with a value interval of [0.5,1], $T_t$ is a safety weight value, that is, a ratio of a length $R_t$ of an overlapped arrival area between a current angle aluminum edge and other robots to a length $L_t$ of the current angle aluminum edge, that is, $T_t=R_t/L_t$;

$\alpha 3$ is an efficiency weight coefficient, with a value interval of [0.2, 0.5], $$S_t = \frac{A_t}{\left(\sum_{t=0}^{total} A_t\right)/total},$$

wherein $A_t$ is total time when the current automatic drilling and riveting robot completes a current angle aluminum edge operation:

$$A_t = A_{safe1\_t} + A_{sm\_t} + A_{safe2\_t} + A_{hd\_t} +$$
$$A_{safe3\_t} + A_{dk\_t} + A_{hd2\_t} + A_{safe4\_t} + A_{tm\_t} + A_{wait\_t}$$

wherein $A_{safe1\_t}$ is time for the robot from the safe point to a scanning start point, $A_{sm\_t}$ is scanning time, $A_{safe2\_t}$ is time from a scanning end point to the safe point, $A_{hd\_t}$ is tool changing time, $A_{safe3\_t}$ is time from a tool changing point to the safe point, $A_{dk\_t}$ is perforating time, $A_{hd2\_t}$ is time when a gluing and riveting tool end is changed, $A_{safe4\_t}$ is time from the tool changing point of a gluing and riveting module to the safe point, $A_{tm\_t}$ is time when gluing and riveting are executed, $A_{wait\_t}$ is wait time, and total is a total quantity of the angle aluminum edges judged to be arrived by the current robot.

6. The method for controlling the multi-robot collaborating intelligent drilling and riveting system for the shelter according to claim 5, wherein allocating the automatic drilling and riveting tasks to the multiple robots in step (3) specifically comprises the following steps:

(3.1) initialization: setting a serial number label N=1 of the automatic drilling and riveting robot, and setting number-of-times labels $M_r=1$ of all angle aluminum edges to be drilled and riveted;

(3.2) acquiring the inputted projection width $w_2$ of the chamfering portion at the top of the shelter in the horizontal plane;

(3.3) judging whether $w_2$ is 0, if $w_2$ is 0, skipping to (3.4), if $w_2$ is not 0, skipping to (3.5);

(3.4) setting a maximum quantity max of the angle aluminum edges to 24 and a maximum plane quantity max_p to 6;

(3.5) setting a maximum quantity max of the angle aluminum edges to 32 and a maximum plane quantity max_p to 8;

(3.6) judging whether N is >4, N is the number of the automatic drilling and riveting robot, and if N is not >4, skipping to (3.7), if N is >4, skipping to (3.26);

(3.7) setting k=1;

(3.8) judging whether k is >max_p, if k is not >max_p, skipping to (3.9), if k is >max_p, skipping to (3.23);

(3.9) setting i=1;

(3.10) judging whether i is >4, if i is not >4, skipping to (3.11), if i is >4, skipping to (3.22);

(3.11) setting t=(k−1)*max_p+i;

(3.12) judging whether an N #$^{th}$ automatic drilling and riveting robot arrives at the $t^{th}$ angle aluminum edge, if the N #$^{th}$ automatic drilling and riveting robot arrives at the $t^{th}$ angle aluminum edge, skipping to (3.13), if the N #$^{th}$ automatic drilling and riveting robot does not arrive at the $t^{th}$ angle aluminum edge, skipping to (3.21);

(3.13) judging whether the number-of-times label of the current angle aluminum edge to be drilled and riveted is $M_t=2$?, if the number-of-times label of the current angle aluminum edge to be drilled and riveted is $M_t=2$, skipping to (3.14), if the number-of-times label of the current angle aluminum edge to be drilled and riveted is not $M_t=2$, skipping to (3.21);

(3.14) substituting set values of the length l of the current angle aluminum edge and a perforating spacing into INT($L_t$/dΔ);

(3.15) calculating a work task weight $$M_t = \frac{INT(L_t/d\Delta)}{\left(\sum_{t=0}^{max}(L_t/d\Delta)\right)/max}$$

of the current angle aluminum edge;

(3.16) calculating a length $L_t$ of an overlapped arrival area between the current drilling and riveting robot and remaining automatic drilling and riveting robots in an operation process of the current angle aluminum edge;

(3.17) calculating the safety weight value $T_t=R_t/L_t$ of the current angle aluminum edge;

(3.18) calculating operation time $A_t = A_{safe1\_t} + A_{sm\_t} + A_{safe2\_t} + A_{hd\_t} + A_{safe3\_t} + A_{dk\_t} + A_{hd2\_t} + A_{safe4\_t} + A_{tm\_t} + A_{wait\_t}$ for the current drilling and riveting robot at the current angle aluminum edge;

(3.19) calculating a processing efficiency weight value $$S_t = \frac{A_i}{\left(\sum_{t=0}^{total} A_t\right)/total}$$

of the current angle aluminum edge;

(3.20) substituting the processing efficiency weight value into the drilling and riveting task propensity model, $F_K = \alpha 1 M_t - \alpha 2 T_t - \alpha 3 A_t$ to calculate a drilling and riveting task propensity of the current angle aluminum edge;

(3.21) i=i+1, skipping to (3.10);

(3.22) k=k+1, skipping to (3.8);

(3.23) sequencing the drilling and riveting task propensity of the current automatic drilling and riveting robot on all angle aluminum edges in a descending order;

(3.24) taking Int(max/3) angle aluminum edges from all angle aluminum edges according to a sequencing result, and setting the number-of-times label of the angle aluminum edge to be drilled and riveted of the angle aluminum edges to $M_t=M_t+1$;

(3.25) N=N+1, skipping to (3.6);

(3.26) setting s=1;

(3.27) judging whether s is >max_p, if s is >max_p, skipping to (3.28), if s is not >max_p, skipping to (3.33);

(3.28) judging whether the $t^{th}$ angle aluminum edge is $M_t>2$, if the $t^{th}$ angle aluminum edge is not $M_t>2$, skipping to (3.32), if the $t^{th}$ angle aluminum edge is $M_i>2$, skipping to (3.29);

(3.29) acquiring the numbers of two automatic drilling and riveting robots with drilling and riveting tasks allocated at the current angle aluminum edges, wherein the number of a first automatic drilling and riveting robot with drilling and riveting tas ks allocated at the current angle aluminum edges is denoted as Number A, wherein the number of a second automatic drilling and riveting robot with drilling and riveting tasks allocated at the current angle aluminum edges is denoted as Number B;

(3.30) calculating quantities Σ($L_z$/dΔ) of drilling tasks allocated to the current two automatic drilling and riveting robots;

(3.31) comparing the quantities of the drilling tasks allocated to the two automatic drilling and riveting robots, allocating a drilling task to an automatic drilling and riveting robot with a relatively small quantity of drilling tasks, if the quantities of the tasks for the two automatic drilling and riveting robots are the same, the task is allocated to the first automatic drilling and riveting robot if the Number A is less than the Number B, and the task is allocated to the second automatic drilling and riveting robot if the Number B is less than the Number A robot with a relatively small number by default;

(3.32) s=s+1, skipping to (3.27);

(3.33) completing allocation of all tasks to the automatic drilling and riveting robots, and sending all allocated drilling and riveting tasks to corresponding automatic drilling and riveting robots according to the stored numbers of the automatic drilling and riveting robots, and starting to execute, by the automatic drilling and riveting robots, automatic drilling and riveting operations in a descending order according to the stored drilling and riveting task propensities.

7. The method for controlling the multi-robot collaborating intelligent drilling and riveting system for the shelter according to claim 1, wherein performing the position compensation in step (4) specifically comprises the following steps:

(4.1) determining a number of the angle aluminum edge;
(4.2) calling the drilling angle compensation value model during automatic drilling and riveting at the angle aluminum edges according to the number of the angle aluminum edge;
(4.3) calculating a distance from each target drilling point to the center of the automatic drilling and riveting robot according to a result obtained by scanning;
(4.4) substituting the distance from each target drilling point to the center of the automatic drilling and riveting robot into the compensation value model to acquire angle compensation values of all drilling points and storing the angle compensation values;
(4.5) compensating the drilling angles according to the acquired compensation values.

8. The method for controlling the multi-robot collaborating intelligent drilling and riveting system for the shelter according to claim 1, wherein the intelligent drilling and riveting system for the shelter comprises the automatic drilling and riveting robots, a quick change disc, a drilling end executor, a riveting and gluing end executor, a 3D visual camera, a tool changing table, a PLC electric control cabinet, a robot bottom plate, a shelter transfer vehicle and the robot ground rail, and there are a total of 4 automatic drilling and riveting robots.

* * * * *